(12) United States Patent
Abboud et al.

(10) Patent No.: US 11,929,880 B2
(45) Date of Patent: Mar. 12, 2024

(54) EDGE COMPUTING TOPOLOGY INFORMATION EXPOSURE

(71) Applicant: Huawei Technologies Co., Ltd., Shenzhen (CN)

(72) Inventors: Osama Abboud, Munich (DE); Riccardo Trivisonno, Munich (DE); Ishan Vaishnavi, Munich (DE); Qing Wei, Munich (DE); Patrice Michel Christophe Hédé, Issy-les-Moulineaux (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/157,501

(22) Filed: Jan. 25, 2021

(65) Prior Publication Data

US 2021/0144063 A1    May 13, 2021

Related U.S. Application Data

(63) Continuation of application No. PCT/EP2018/070013, filed on Jul. 24, 2018.

(51) Int. Cl.
| | |
|---|---|
| *H04L 41/12* | (2022.01) |
| *H04L 41/14* | (2022.01) |
| *H04W 4/40* | (2018.01) |
| *H04W 28/08* | (2023.01) |
| *H04W 84/04* | (2009.01) |

(52) U.S. Cl.
CPC .............. *H04L 41/12* (2013.01); *H04L 41/14* (2013.01); *H04W 28/08* (2013.01); *H04W 4/40* (2018.02); *H04W 84/042* (2013.01)

(58) Field of Classification Search
CPC ........... H04W 4/40; H04L 41/12; H04L 41/14
See application file for complete search history.

(56) References Cited

U.S. PATENT DOCUMENTS

| | | | |
|---|---|---|---|
| 6,553,413 B1 | 4/2003 | Leighton et al. | |
| 7,865,582 B2 | 1/2011 | Santos et al. | |
| 11,184,830 B2* | 11/2021 | Li | ......................... H04W 40/34 |
| 2010/0312913 A1* | 12/2010 | Wittenschlaeger | ....... G06F 9/54 |
| | | | 709/238 |

(Continued)

FOREIGN PATENT DOCUMENTS

WO    2018089417 A1    5/2018

OTHER PUBLICATIONS

Villari et al., "Osmotic Computing: A New Paradigm for Edge/Cloud Integration", IEEE Publishing, Oct. 2016.*

(Continued)

*Primary Examiner* — Todd L Barker
(74) *Attorney, Agent, or Firm* — Leydig, Voit & Mayer, Ltd.

(57) ABSTRACT

An edge computing (EC) entity belongs to an EC system, and a mobile communication core MCC entity belongs to a MCC system, like a 3GPP system. The EC entity is configured to obtain topology information of the EC system, and expose the topology information to another network, in particular to a MCC system. The MCC entity is configured to receive topology information of an EC system from the EC entity, and provide the topology information to a network exposure function (NEF) or to a policy control function (PCF) of the MCC system.

16 Claims, 15 Drawing Sheets

(56) References Cited

U.S. PATENT DOCUMENTS

| | | | | |
|---|---|---|---|---|
| 2011/0292832 | A1* | 12/2011 | Bottari | H04L 41/0896 |
| | | | | 370/254 |
| 2013/0166712 | A1 | 6/2013 | Chandramouli et al. | |
| 2014/0122698 | A1* | 5/2014 | Batrouni | H04L 41/0896 |
| | | | | 709/224 |
| 2015/0063166 | A1 | 3/2015 | Sif et al. | |
| 2016/0147552 | A1 | 5/2016 | Zhang et al. | |
| 2017/0054595 | A1* | 2/2017 | Zhang | H04L 41/12 |
| 2017/0230306 | A1* | 8/2017 | Cropper | G06F 9/5083 |
| 2017/0251368 | A1 | 8/2017 | Ross et al. | |
| 2017/0279881 | A1* | 9/2017 | Chang | H04L 67/1004 |
| 2017/0367026 | A1* | 12/2017 | Li | H04W 12/08 |
| 2018/0077024 | A1* | 3/2018 | Zhang | H04L 63/0272 |
| 2018/0173570 | A1* | 6/2018 | Chintalapally | G06F 9/5044 |
| 2019/0141142 | A1* | 5/2019 | Filippou | H04L 67/51 |
| 2019/0174449 | A1* | 6/2019 | Shan | H04W 76/11 |
| 2019/0253896 | A1* | 8/2019 | Aydin | H04W 72/0413 |
| 2019/0313236 | A1* | 10/2019 | Lee | H04W 88/023 |
| 2020/0120589 | A1 | 4/2020 | Velev et al. | |
| 2020/0267518 | A1* | 8/2020 | Sabella | H04W 12/06 |
| 2020/0296187 | A1* | 9/2020 | Sabella | H04L 67/289 |
| 2020/0389531 | A1* | 12/2020 | Lee | H04L 61/1511 |
| 2021/0051519 | A1* | 2/2021 | Bedekar | H04W 36/22 |
| 2021/0084484 | A1* | 3/2021 | Marjou | H04W 12/0433 |
| 2021/0092020 | A1* | 3/2021 | Maguire | H04L 41/12 |
| 2021/0099316 | A1* | 4/2021 | Wang | H04M 15/64 |
| 2021/0099848 | A1* | 4/2021 | Ruan | H04W 4/44 |
| 2021/0099976 | A1* | 4/2021 | Mueck | H04W 4/40 |
| 2021/0211914 | A1* | 7/2021 | de la Oliva | H04W 24/10 |
| 2021/0288886 | A1* | 9/2021 | Örtenblad | G06F 8/60 |

OTHER PUBLICATIONS

Abbas et al., "Mobile Edge Computing: A Survey", IEEE Publishing, Feb. 2017.*
Aral et al., "A Decentralized Replica Placement Algorithm for Edge Computing", IEEE Publishing, Jan. 2018.*
Kekki et al., "MEC in 5G networks", Jun. 2018.*
Giust et al., "MEC Deployments in 4G and Evolution Towards 5G", Feb. 2018.*
Abbas et al., "Mobile Edge Computing: A Survey," IEEE Internet of Things Journal, vol. 5, No. 1, total 16 pages, Institute of Electrical and Electronics Engineers, New York, New York (Feb. 2018).
"3rd Generation Partnership Project; Technical Specification Group Services and System Aspects; Study on Communication for Automation in Vertical Domains (Release 16)," 3GPP TR 22.804 V16.0.0, total 189 pages, 3rd Generation Partnership Project, Valbonne, France (Jun. 2018).
"3rd Generation Partnership Project; Technical Specification Group Services and System Aspects; System Architecture for the 5G System; Stage 2 (Release 15)," 3GPP TS 23.501 V15.2.0, total 217 pages, 3rd Generation Partnership Project, Valbonne, France (Jun. 2018).
"3rd Generation Partnership Project; Technical Specification Group Services and System Aspects; Policy and Charging Control Framework for the 5G System; Stage 2 (Release 15)," 3GPP TS 23.503 V15.2.0, total 67 pages, 3rd Generation Partnership Project, Valbonne, France (Jun. 2018).
Huawei, HiSilicon, "Support for MEC topology exposure for efficient UPF anchor selection," 3GPP TSG-SA WG2 Meeting #127-bis, Newport Beach, CA, USA, S2-185343, pp. 1-4, 3rd Generation Partnership Project, Valbonne, France (May 28-Jun. 1, 2018).

* cited by examiner

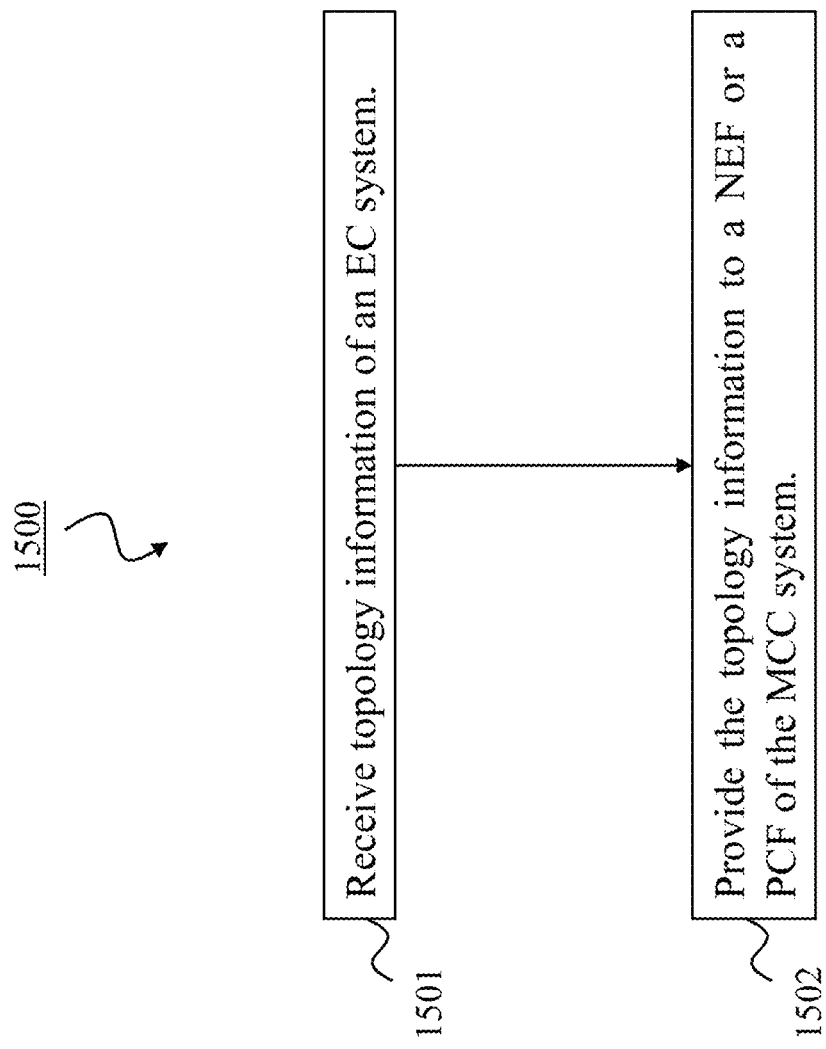

EDGE COMPUTING TOPOLOGY INFORMATION EXPOSURE

CROSS-REFERENCE TO RELATED APPLICATION

This application is a continuation of International Application No. PCT/EP2018/070013, filed on Jul. 24, 2018, the disclosure of which is hereby incorporated by reference in its entirety.

FIELD

The present disclosure relates to the technical field of Edge Computing (EC), particularly to EC systems like Multi-access EC (MEC) systems.

BACKGROUND

Towards 5th Generation mobile technology (5G) substantial efforts are made, in order to enable next generation communication systems. The 5G endeavor is particularly driven by diversified use cases and scenarios. These range from high bandwidth to ultra-low latency and high reliability use cases. To support such use cases, EC is regarded as an important building block.

As per 3GPP SA1 TR 22.804 (see www.3gpp.org/TR22.804), MEC is identified as being important for critical low latency applications, e.g. automation and Vehicle-to-Anything (V2X). This is due to the very low latencies offered by deploying smaller Edge Data Centers (EDCs) of a MEC close to User Equipment (UE), e.g. close to vehicles or robots. Also non-3GPP platforms and architectures are getting more mature, e.g.: European Telecommunications Standards Institute (ETSI) MEC (www.etsi.org Multi Access Edge Computing), Open Network Automation Platform (ONAP) (www.onap.org), Openstack, etc. These platforms allow more on-demand deployment of EC systems close to 3GPP access points (e.g. Radio Access Networks (RANs)).

3GPP TS 23.501 defines how the 5G system supports EC, particularly through:
1. User plane (re)selection to route traffic towards local Data Networks (also referred to as EDCs).
2. Local routing and traffic steering that is able to use multiple Packet Data Unit (PDU) anchors to selectively route traffic to a local EDC.
3. Session and service continuity to allow for UE and application mobility.
4. Application Function (AF) influence allowing the AF to route traffic.

The focus of the present disclosure is specifically around the AF influence on the traffic routing. The standard implementation defines how the AF can conventionally trigger the (re)routing of traffic towards a local EDC. Currently, this rerouting is performed via an AF request sent to the Policy Control Function (PCF) by specifying a list of Data Network Access Identifiers (DNAIs). A DNAI is an identifier to reach a Data Network Name (DNN) hosting MEC nodes that host EDCs, which serve edge computing traffic. That is, each DNAI is related to an EDC in the MEC system.

One issue of this current standard implementation is that the AF sends only limited information about the EDCs, namely basically only the list of DNAIs. This limits the amount of information available to the 3GPP system, and leads to the following problems:
1. The availability of an EDC is conveyed only by specifying the list of DNAIs in the AF requests. The Session Management Function (SMF) of the 3GPP system has then to make a decision which DNAI to select, without much information about the topology of the MEC system, e.g. about locations and loads of EDCs.
2. In the case that a DNAI closer to the UE is momentarily overloaded, performance degradation will happen, due to lack of information.
3. It is not possible for the MEC provider to specify load balancing algorithms, e.g. Round Robin, weighted, or even differentiated service. The MEC provider has no means to influence the selection at the 3GPP system for a proper load balancing and weighting.
4. In many cases, the 3GPP system receives multiple DNAIs to choose from, which leads to a less efficient decision making, due to lack of information.
5. MEC specific technology might further lack information about UE locations, slice info, QoS flows, in order to do a proper DNAI selection. Therefore, in many cases the 3GPP system cannot take a proper decision. It is implied that the 3GPP system will do the DNAI selection, however, due to the lack of proper interfaces between 3GPP and MEC systems, this is currently an open problem.
6. A single DNAI can have multiple connection entry points for load balancing/redundancy. It is not possible to make use of multi connectivity MEC regions.
7. No differentiation between EDCs of different sizes can be made.

Accordingly, the use of a simple DNAI list to request traffic (re)routing is the reasons for the above problems, and is thus not enough to handle complex EC/MEC scenarios, particularly for verticals (e.g. V2X).

SUMMARY

So far, the above-discussed concerns have been addressed by intensive manual configuration and/or deployment specific implementations. However, this has the disadvantage that the configuration or implementation cannot be reused. Currently no topology information or dynamic load information can be conveyed from a large number of EDCs, as there is no standardized interface for this.

The present disclosure thus provides improved interactions between an EC system and another network, particularly a MCC system like a 3GPP system. An aspect of the disclosure is in particular to provide more efficient EC enabled network systems. The disclosure provides more information about the EC to the other network, in order to facilitate a more efficient and better selection process at the other network.

The present disclosure provides topology information exposure from the EC system towards the other network (e.g. MCC or 3GPP system). Thereby, three levels of topology information exposure are used: full exposure, weighted exposure, and algorithmic exposure. These three levels can be used as per the deployment scenarios. An implementation of the disclosure may specifically be based on a management system access of the MCC system, as well as an AF access towards the MCC system.

A first aspect of the disclosure provides an EC entity for managing an EC system, the EC entity being configured to obtain topology information of the EC system, and expose the topology information to another network, in particular to a MCC system.

Topology information is generally information about the topology of the EC, and is information that can be used in selecting an EDC of the EC system by the other network. Accordingly, the topology information may, for instance, describe arrangement, locations, identifications, and/or status of the EDCs in the EC system. Further, the topology information may alternatively or additionally describe an arrangement and/or status of links to and/or from EDCs in the EC system. More specifically, the topology information may comprise information on location, load, availability, identification, and/or link load of one EDC or more EDCs in the EC system.

Exposing the topology information to the other network improves the interaction between the EC system and the other network. As a consequence, the selection of EDCs by the other network is facilitated and significantly more efficient. This generally allows for the realization of more efficient EC enabled networks.

In an implementation form of the first aspect, the entity is configured to expose, as the topology information, a full topology of all EDCs in the EC system to the other network.

The full topology information gives the other network the most detailed information to make a most efficient selection. It may in particular be information on each EDC in the EDC system, both in absolute terms and relative to the other EDCs. The full topology information exposure is particularly applicable, if the EC system and the other network are owned by the same operator.

In a further implementation form of the first aspect, the topology information includes at least one of: a load of at least one DC in the EC system, a load on at least one link to a EDC in the EC system, an availability of at least one EDC in the EC system, a location of at least one EDC in the MEC system, an address or identification of at least one EDC in the EC system, multiple access information of the EC system.

Any one of the above information parameters allows the other network to improve the EDC selection process. Thus, more efficient EC is achieved.

In a further implementation form of the first aspect, the entity is configured to expose, as the topology information, a weight or priority of each EDC in the EC system to the other network.

A weight or priority of an EDC generally means a relative preference of one EDC with respect to the other EDCs. This provides a guidance for the selection at the other network. According to the weights or priorities, a traffic distribution may be controlled. That is, different amounts of traffic may be routed to different EDCs based on their weights and/or priorities. This topology information exposure approach is particularly applicable and advantageous, if the operator of the EC system does not want to reveal full topology information. Each weight or priority may be associated with a spatial or temporal validity, which may be updated on a regular basis.

In a further implementation form of the first aspect, the entity is configured to determine the weight or priority of an EDC based on the capacity and/or load of the EDC in the EC system compared to other EDCs in the EC system.

Thus, for example, load balancing for the traffic distribution to the EDCs is enabled.

In a further implementation form of the first aspect, the entity is configured to determine the weight of an EDC dynamically and/or with a determined spatial or temporal validity.

"Dynamically" in the sense of the disclosure comprises periodical, event-driven (load-dependent). Thus, the traffic routing may adjust to (topology) changes in the EC system.

In a further implementation form of the first aspect, the entity is configured to expose, as the topology information, a determined selection algorithm for selecting EDCs to the other network.

For instance, a desired selection criterion may be exposed in this way, e.g. Round Robin, shortest path etc. The other network is accordingly provided clear instructions for efficiently selecting one or more EDCs.

Notably, it is also possible that the entity is configured to expose, as the topology information, a full topology of all EDCs, or a weight or priority off each EDC, together with the determined selection algorithm for selecting the EDCs.

In a further implementation form of the first aspect, the determined selection algorithm includes a Round Robin algorithm, UE proximity based algorithm, and/or an algorithm based on service differentiation.

Generally, the selection algorithm may be a UE profile based algorithm, wherein UE location is an example of a UE profile. The algorithm could also be a time based algorithm.

In a further implementation form of the first aspect, the entity is configured to expose the topology information via an interface to a management entity of the other network, a NEF of the other network, or an AF of the other network.

In a further implementation form of the first aspect, the entity is configured to provide topology information updates to the other network, particularly via an interface to an AF of the other network, or an NEF of the other network.

Topology updates reflect topology changes of the EC system. The topology updates may be provided by exposing complete new topology information. However, the topology updates may also be provided incrementally with respect to previously exposed topology information.

A second aspect of the disclosure provides a MCC entity for a MCC system, configured to receive topology information of an EC system from an EC entity, and provide the topology information to a NEF or a PCF of the MCC system.

From the NEF or PCF, the topology information can be further provided to the SMF, which can then make a decision about which EDCs to select. According to the disclosure, the decision making entity in the MCC has sufficient information about the topology of the EC system, e.g. about the locations and load of the EDCs. Overall, by receiving the topology information from the EC system, a better and more efficient selection can be made at the MCC system.

In an implementation form of the second aspect, the MCC entity is a MCC system management entity or is an AF of the MCC system.

In a further implementation form of the second aspect, the MCC entity is configured to provide the topology information together with one or more DNAIs to the NEF or PCF, wherein each DNAI is related to a DC in the EC system.

Thus, the selection of the EDCs (DC in EC system) can be made based on DNAIs and topology information.

In a further implementation form of the second aspect, the MCC entity is configured to provide the topology information together with one or more DNAIs to the PCF via a Network Data Analytics Function (NWDAF) of the MCC entity, wherein the NWDAF is further configured to process the topology information based on the history or combine it with other information from the networks, e.g. UE location statistic, before providing it to the PCF.

A third aspect of the disclosure provides a method for an EC system, the method comprising obtaining topology information of the EC system, and exposing the topology information to another network, in particular to a MCC system.

In an implementation form of the third aspect, the method comprises exposing, as the topology information, a full topology of all EDCs in the EC system to the other network.

In a further implementation form of the third aspect, the topology information includes at least one of: a load of at least one DC in the EC system, a load on at least one link to a EDC in the EC system, an availability of at least one EDC in the EC system, a location of at least one EDC in the MEC system, an address or identification of at least one EDC in the EC system, multiple access information of the EC system.

In a further implementation form of the third aspect, the method comprises exposing, as the topology information, a weight or priority of each EDC in the EC system to the other network.

In a further implementation form of the third aspect, the method comprises determining the weight or priority of an EDC based on the capacity and/or load of the EDC in the EC system compared to other EDCs in the EC system.

In a further implementation form of the third aspect, the method comprises determining the weight of an EDC dynamically and/or with a determined spatial or temporal validity.

In a further implementation form of the third aspect, the method comprises exposing, as the topology information, a determined selection algorithm for selecting EDCs to the other network.

In a further implementation form of the third aspect, the determined selection algorithm includes a Round Robin algorithm, UE proximity based algorithm, and/or an algorithm based on service differentiation.

In a further implementation form of the third aspect, the method comprises exposing the topology information via an interface to a management entity of the other network, a NEF of the other network, or an AF of the other network.

In a further implementation form of the third aspect, the method comprises providing topology information updates to the other network, particularly via an interface to an AF of the other network, or an NEF of the other network.

Accordingly, the method of the third aspect and its implementation forms achieve all advantages and effects of the entity of the first aspect and its respective implementation forms.

A fourth aspect of the present disclosure provides a method for a MCC system, the method comprising receiving topology information of an EC system, and providing the topology information to a NEF or a PCF of the MCC system.

In an implementation form of the fourth aspect, the method is performed by a MCC system management entity or an AF of the MCC system.

In a further implementation form of the fourth aspect, the method comprises providing the topology information together with one or more DNAIs to the NEF or PCF, wherein each DNAI is related to an EDC in the EC system.

In a further implementation form of the fourth aspect, the method comprises providing the topology information together with one or more DNAIs to the PCF via a NWDAF.

Accordingly, the method of the fourth aspect and its implementation forms achieve all advantages and effects of the entity of the second aspect and its respective implementation forms.

It has to be noted that all devices, elements, units and means described in the present disclosure could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the disclosure will be explained in the following description of exemplary embodiments in relation to the enclosed drawings, in which

FIG. 15 shows a method according to an embodiment of the disclosure to be performed by a MCC system.

DETAILED DESCRIPTION

Figure 1:
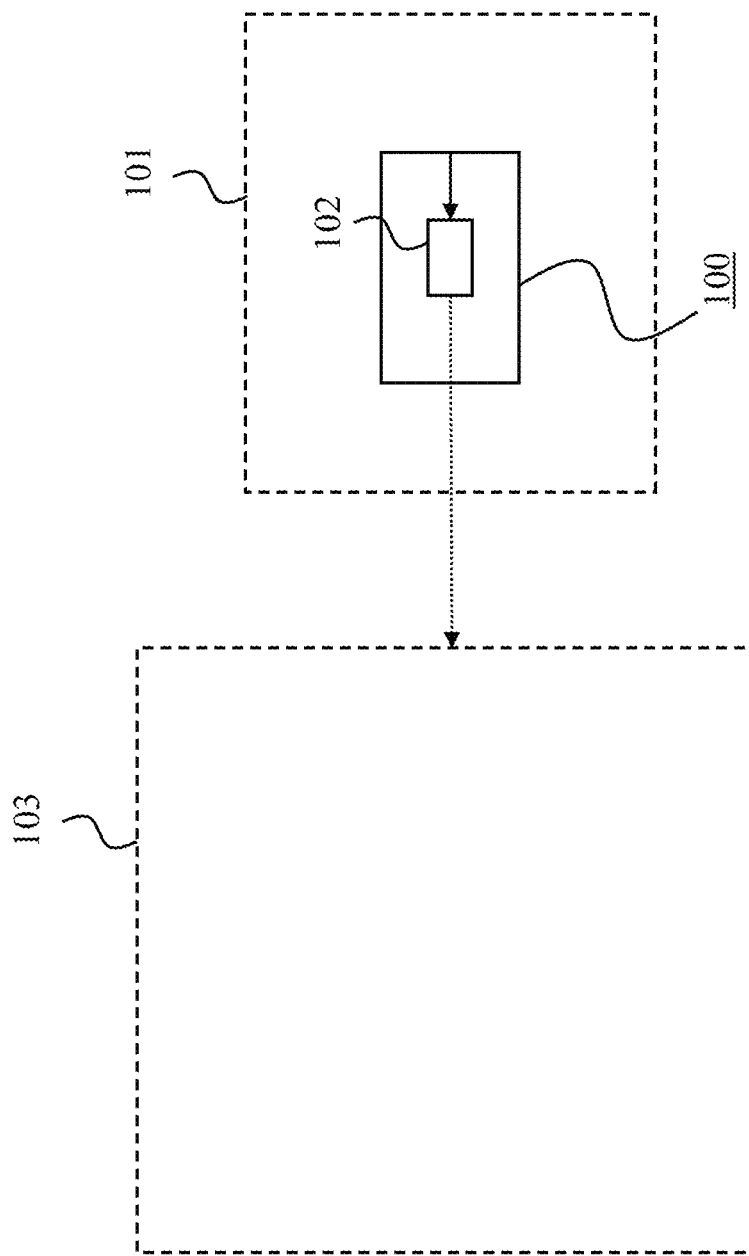
FIG. 1 shows an EC entity according to an embodiment of the disclosure.

FIG. 1 shows an EC entity 100 according to an embodiment of the disclosure. The EC entity 100 is particularly configured to manage an EC system 101, for instance, an MEC system. It may thus be located in the EC system 101. The entity 100 may, for instance, be a management entity of the EC system, i.e. may be implemented by a Mobile Edge Computing Management System (MEC MS). It may also be implemented by a Mobile Edge Orchestrator or a Mobile Edge Platform Manager.

The EC entity 100 of FIG. 1 is configured to obtain topology information 102 of the EC system 101. The topology information 102 may, for example, be generated by the EC entity 100, or may be received from another dedicated topology information generation entity, or retrieved from a storage maintaining (pre)defined topology information 102 about the EC system 101. Further, the EC entity 100 is configured to expose (dotted line) the topology information 102 to another network 103, wherein the other network 103 may particularly be a MCC system like a 3GPP system, e.g. a 5G system. The entity 100 may specifically expose the topology information 102 by sending it to the other network 103, or by sharing it with the other network 103 such that the other network 103 can retrieve it from the entity 100 or some memory.

Figure 2:
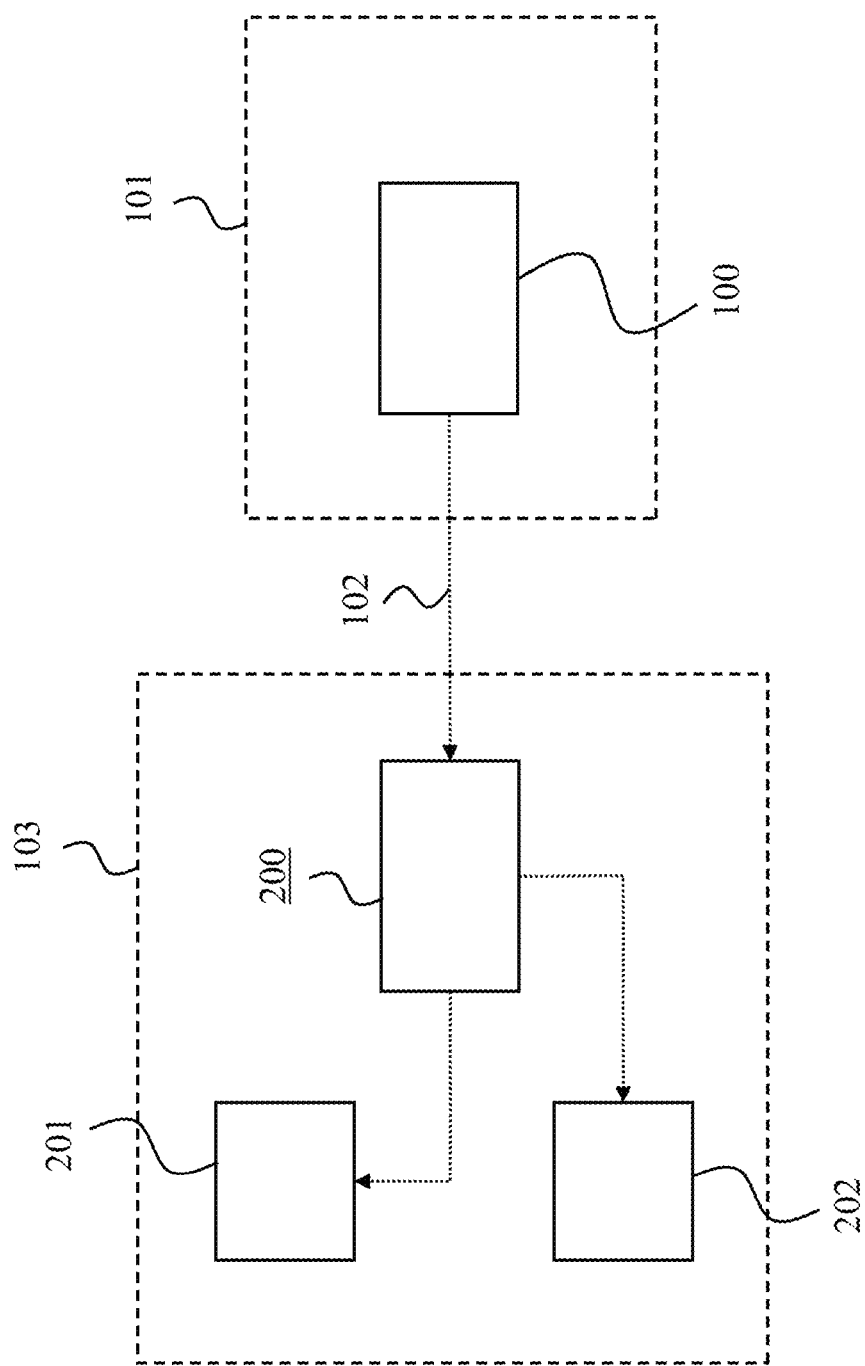
FIG. 2 shows a MCC entity according to an embodiment of the disclosure.

FIG. 2 shows a MCC entity 200 according to an embodiment of the disclosure. The MCC entity 200 is particularly suitable for a MCC system 201 like a 3GPP system. The MCC entity 200 may be a MCC system management entity, e.g. may be a 3GPP Management System (3GPP MS) or may be an AF.

The MCC entity 200 is configured to receive (dotted line) topology information 102 of an EC system 101 from an EC entity 100, for instance from the EC entity 100 shown in FIG. 1 and described above. The MCC entity 200 may then provide the received topology information 102 further to a NEF 201 or a PCF 202, which may again provide it further to a decision taking entity of the MCC system 103, e.g. a SMF. That is, the MCC entity 200 is configured to distribute the topology information 200 in the MCC system 103.

Figure 3:
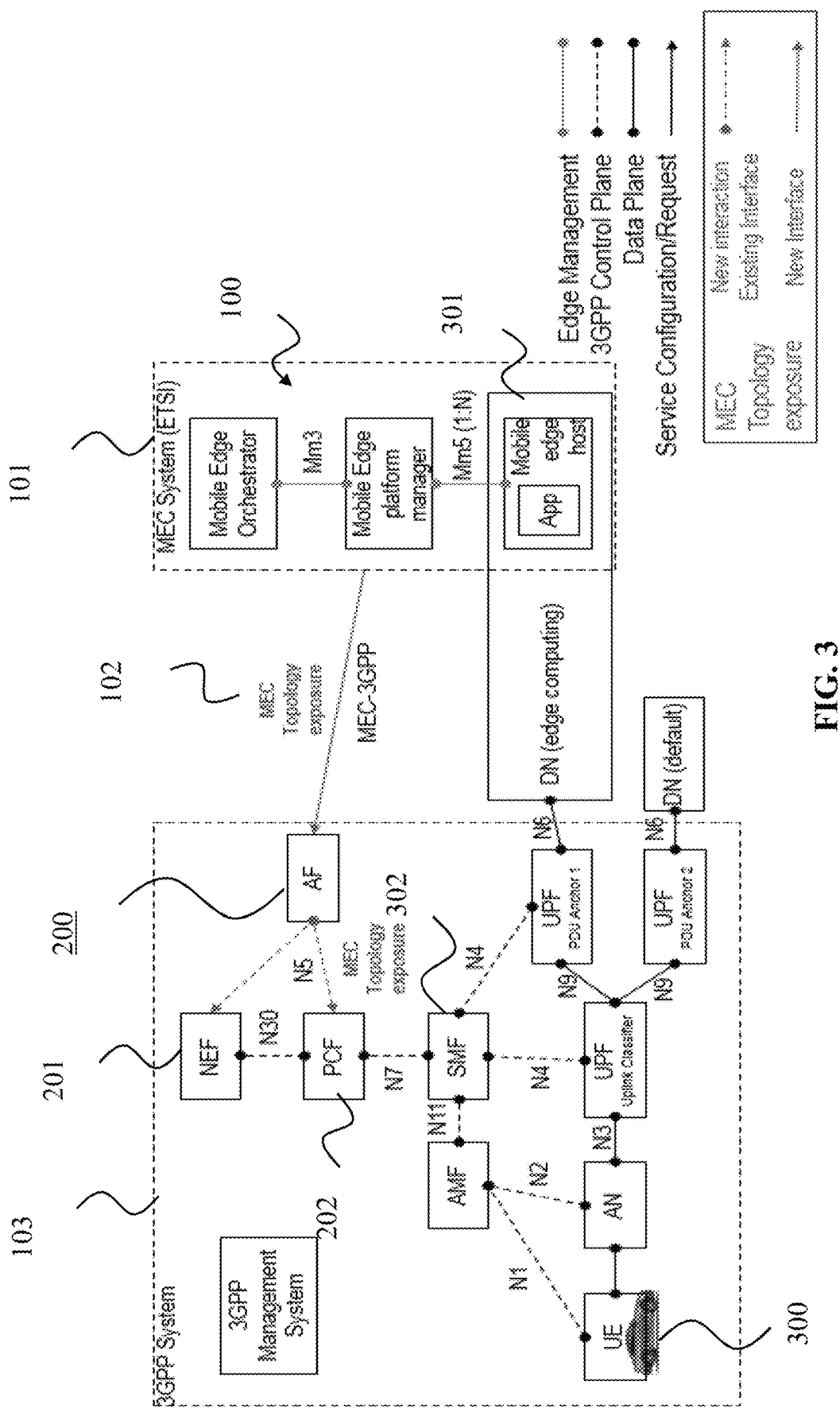
FIG. 3 shows an architecture and interaction of an EC system and a 3GPP system.

FIG. 3 shows an architecture and interaction of an EC system 101, particularly a MEC system, and a 3GPP system (5GS) as the other network 103. A standard architecture is assumed for both the MEC system 101 (e.g. based on ETSI standard) and the 3GPP system 103. In FIG. 3, a communication service customer (which can e.g. be a vertical customer) may be interested in deploying an MEC application near its UE 300 (for example, a car in case the vertical is a car manufacturer).

Three actions may be taken by the communication service customers:
1. A request from the Customer Service and Support (CSS) towards the MEC system 101 to deploy a MEC application across different edge locations.
2. A configuration from the CSS towards the 3GPP system 103 to influence the rerouting of UE traffic to the DNNs based on certain criteria.
3. A trigger to start routing towards EDCs.

FIG. 3 shows a simplified architecture of a MEC system 101 and a 3GPP system 103 that work together. In particular, a high-level architecture of each of the two systems 101 and 103 is shown. The disclosure provides interfaces ("MEC Topology exposure") that enable the topology information 102 exposure from the MEC system 101 towards the 3GPP system 103. The topology information 102 exposure is first being conveyed from the MEC system 101 (e.g. from an MEC entity 100, like the Mobile Edge Orchestrator or the Mobile Edge platform manager, or another entity in the MEC system 101) over a new interface MEC-3GPP to the AF (which acts in FIG. 3 as the MCC entity shown in FIG. 2 and is thus labelled 200), which in turns uses existing interfaces N5 towards the NEF 201 (for an untrusted AF 200) or existing interfaces N5 towards the PCF 202 (for a trusted AF 200) to forward the topology information 102. In order to route traffic from a certain UE 300 to an EDC 301 (i.e. a local DN for EC), the SMF 302 advantageously knows the locations of the applications. Such locations are represented using the identifiers called DNAI. These DNAIs are sent from the AF 200 to the PCF/NEF 201/202. For a full detailed description of the technologies defined in 5GS, reference is made to 3GPP Sec TS 23.501 Section 13. According to the disclosure, the information exchanged between the MEC system 101 and the 3GPP AF 200, as well as the information exchanged between the AF 200 and NEF/PCF 201/202, is extended, particularly by additionally including the topology information 102 of the MEC system 101. The benefit is a much better interworking of the two systems 101 and 103, and a better quality of service, due to a more efficient EDC 301 selection process at the 3GPP system 103.

Three schemes to enhance the MEC system/3GPP system 101/103 interaction by including said topology information 102 are envisaged. These schemes are based on different topology information 102 exposure levels:

1. Full topology exposure: This allows the AF 200 to report full topology information 102 of the different EDCs 301 and associated DNAIs. That is, the EC entity 100 may expose, as the topology information 102, a full topology of all EDCs 301 in the MEC system 101 to the 3GPP system 103. This is, for instance, preferred in case the operator is owning both MEC system 101 and 3GPP system 103. The full topology metrics and their relevance to critical applications are disclosed further below.

2. Limited topology exposure and weighted DNAI influence: In case the MEC system operator does not want to reveal full topology as the topology information 102, the operator can associate each DNAI with a specific weight/priority. That is, the EC entity 100 may expose, as the topology information 102, a weight or priority of each EDC 301 in the MEC system 101 to the 3GPP system 103. In this way a custom traffic distribution can be controlled. The weight can also be associated with a specific spatial and temporal validity. Such a topology information 102 exposure can look, for instance, like: (DNAI1, weight: 30%), (DNAI2, weight: 20%), (DNAI3: weight 50%).

3. Influencing the selection criteria (algorithm) of different DNAIs: In case the MEC operator would like a specific selection criteria, this exposure method can be used by providing the required selection criteria, e.g. Round Robin, shortest path, etc. That is, the EC entity 100 may expose, as the topology information 102, a determined selection algorithm for selecting EDCs 301 to the other network 103. In addition, it is also possible to associate certain set of DNAIs to a certain QCI flow or slice information.

Figure 4:
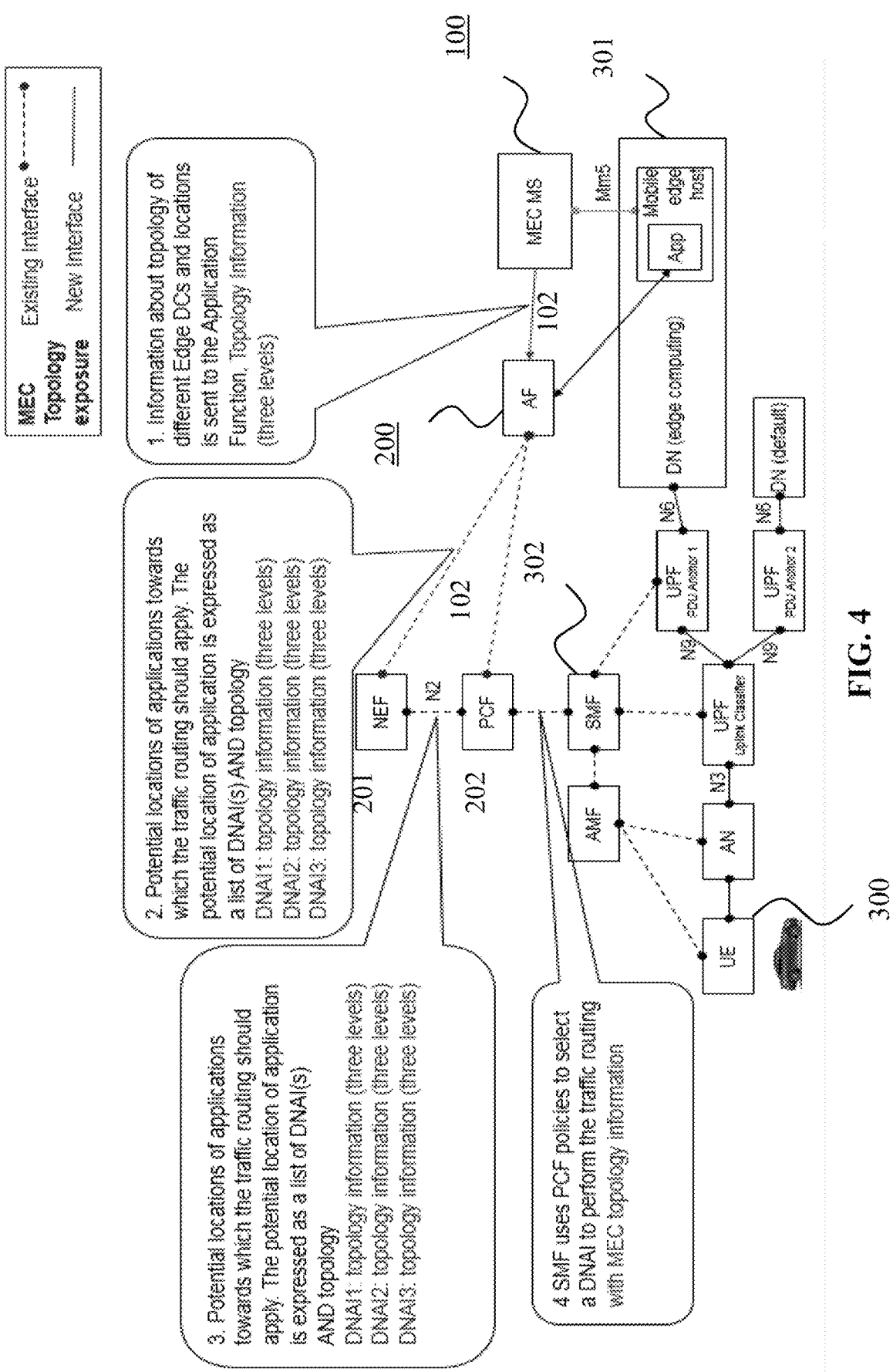
FIG. 4 shows a message flow diagram for an interaction of an EC system and a 3GPP system.

FIG. 4 shows a message flow diagram in an architecture and for an interaction of a MEC system 101 and a 3GPP system 103. In particular, FIG. 4 shows the basic architectural message flow diagram. It is proposed to allow the MEC MS 100 (which acts in FIG. 4 as the EC entity of FIG. 1 and is thus labelled 100) to expose the topology information 102 to the AF (which acts in FIG. 4 as the MCC entity shown in FIG. 2 and is thus labelled 200). The topology information 102 exposure can have any of the three levels explained above, i.e.: full topology exposure, limited topology exposure with weighted DNAI selection, or algorithmic exposure. The AF 200 itself forwards those topology information 102 to the NEF 201 or PCF 202 (trusted AF 200) when it requests the rerouting of UE 300 traffic to a certain DNAI. The topology information 102 is used by the SMF 302 upon creation of a new PDU session. The topology information 102 can be used by the PCF 202 to better handle complex EC platform architectures as well as dynamic and mobile UEs 300 and applications.

Figure 5:
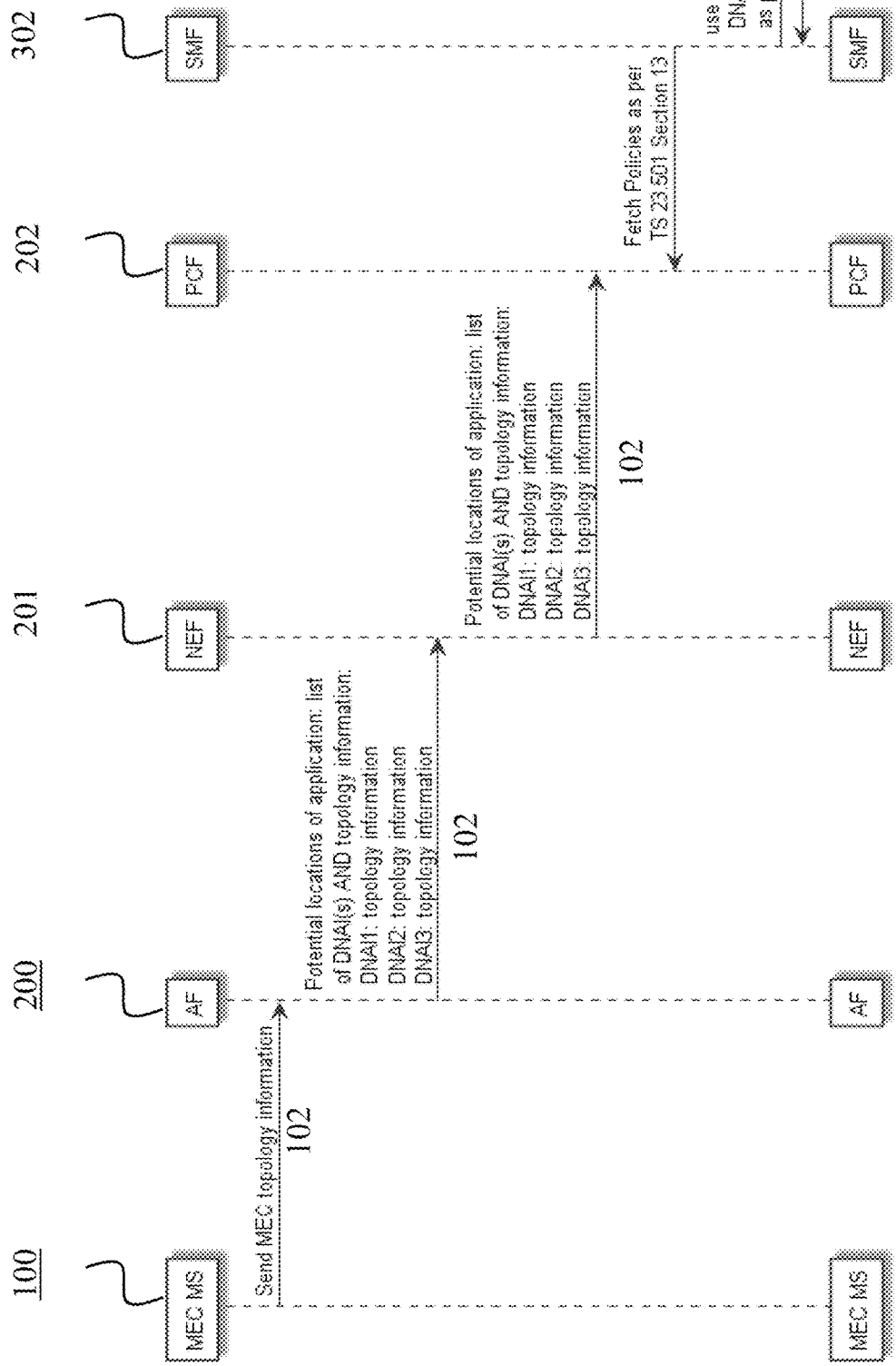
FIG. 5 shows a sequence diagram of a topology information exposure from an EC system towards a 3GPP (5G) system.

FIG. 5 shows a sequence diagram of a topology information 102 exposure from an MEC system 101 towards a 3GPP (5G) system 103. In particular, FIG. 5 shows the message flows for the topology information 102 exposure. Notably, the topology information 102 can again have the three levels explained above, which are hereafter described in more detail.

The first level topology information 102 exposure is the full topology information exposure. For instance, in the case the operator is managing both the 3GPP system 103 and the MEC system 101, the operator may wish to have full topology information 102 exposure for a best matching of UE requirements with MEC network capacities. In this case, it is proposed that the topology information 102 exposure may include the following metrics.

1. Edge_DC_load (i.e. a load of at least one EDC 301 in the MEC system 101)
   Importance: If traffic is routed to an overloaded EDC 301, performance degradation may happen.
   Critical for high processing applications, e.g. remote driving, automation/remote control.
2. Edge_DC_link_load (i.e. a load on at least one link to an EDC 301 in the MEC system 101)
   Importance: In case the link to the EDC 301 is overloaded, some traffic may be dropped.
   Critical for high bandwidth applications.
3. Edge_DC_availability (i.e. an availability of at least one EDC 301 in the MEC system 101)
   Importance: Indicates whether this EDC 301 is available for specific application/AF-Service-Identifier.
   Critical for high availability.
4. Edge_DC_location (i.e. a location of at least one EDC 301 in the MEC system 101)
   Importance: Indicates the geo location of the EDC 301.
   Critical for reducing end-to-end latency and achieving proximity.
5. Addressing_and_Identification (an address or identification of at least one EDC 301 in the MEC system 101)
   Importance: There may be different regions available within the same DNN.
   Critical to identify different edge servers within the same DNN.
6. Multiple access information (i.e. multiple access information of the MEC system 101)
   Importance: A single DNN might have multiple links. Currently just a list of N6 routing information is provided, no indication on link characteristics.
   Critical for load balancing and link utilization.

The second level topology information 102 exposure is the limited/weighted topology information 102 exposure. In case the 3GPP system operator is the not the same as the MEC system operator, both operators may desired a limited topology information 102 exposure. Here, it is suggested to use a weighted exposure to reflect the capacity of different MEC EDCs 301.

Such a weighted exposure could look like:
(DNAI1, weight: 30%), (DNAI2, weight: 20%), (DNAI3, weight: 50%).

The different weights are assumed to be defined by the EC management system and its provider to reflect desired traffic distribution among the different EDCs 301. How those weights are calculated is left for the EC provider implementation. However, it may be assumed that such a weight is influenced by the capacity and/or load of the different EDCs 301. The weights could be static or dynamic. In case of dynamic weights, the weights are expected to change e.g. depending on the load of the different EDCs 301. Therefore, using the proposed solution, the EC system 101 can convey different EDC 301 sizes and/or capacities and/or achieve a lazy load reporting. The reported weights can be defined for certain spatial or temporal validity so that to have different load patterns in different geo location or at different times of the day.

The third level topology information 102 exposure is an algorithmic topology information exposure. This again addresses the case, in which two different operators are managing the MEC and 3GPP systems 101 and 103. As the final selection of the DNAI is typically performed by the SMF 302, the MEC system 101 conventionally has little control on the algorithm used for the DNAI selection. Here it the MEC system 101 is enabled to convey the required selection algorithm required. This allows specific selection patterns or even service differentiation. Such selection criteria can be: Round Robin, UE proximity, service differentiation (based on QCI).

Figure 6:
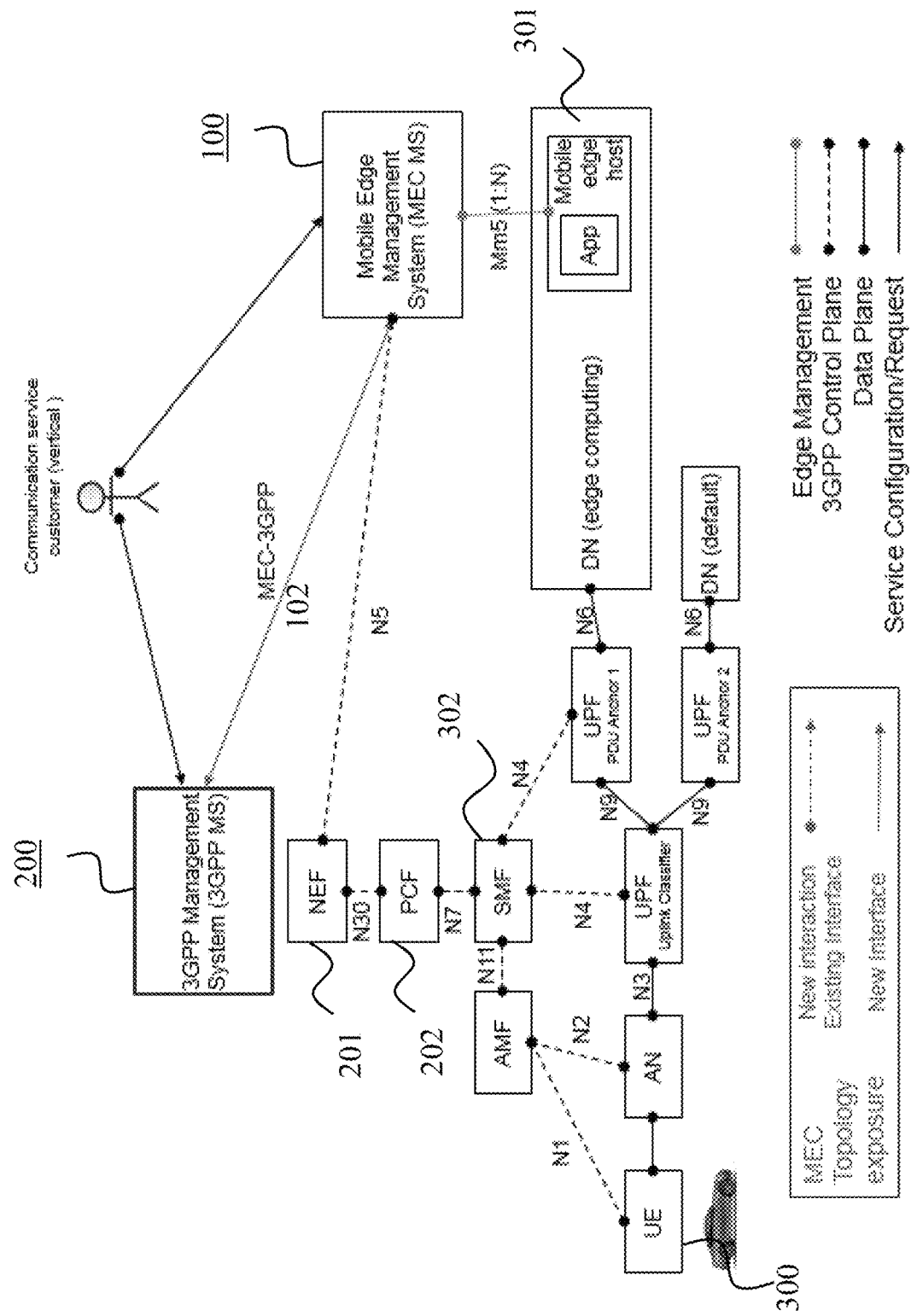
FIG. 6 shows an architecture and interaction of an EC system and a 3GPP system.

FIG. 6 shows an architecture and interaction of a MEC system 101 and a 3GPP system 103. In particular, FIG. 6 shows a first exemplary embodiment. In this exemplary embodiment, the MEC MS (which acts in FIG. 6 as the EC entity of FIG. 1 and is thus labelled 100) sends topology information 102 to the PCF 202 over the 3GPP MS (which acts in FIG. 6 as the MCC entity of FIG. 2 and is thus labelled 200). The MEC MS 100 uses the new interface MEC-3GPP to send the topology information 102 to the 3GPP MS 200. The MEC MS 100 acts accordingly as an AF, an updates are sent to NEF 201.

Figure 7:
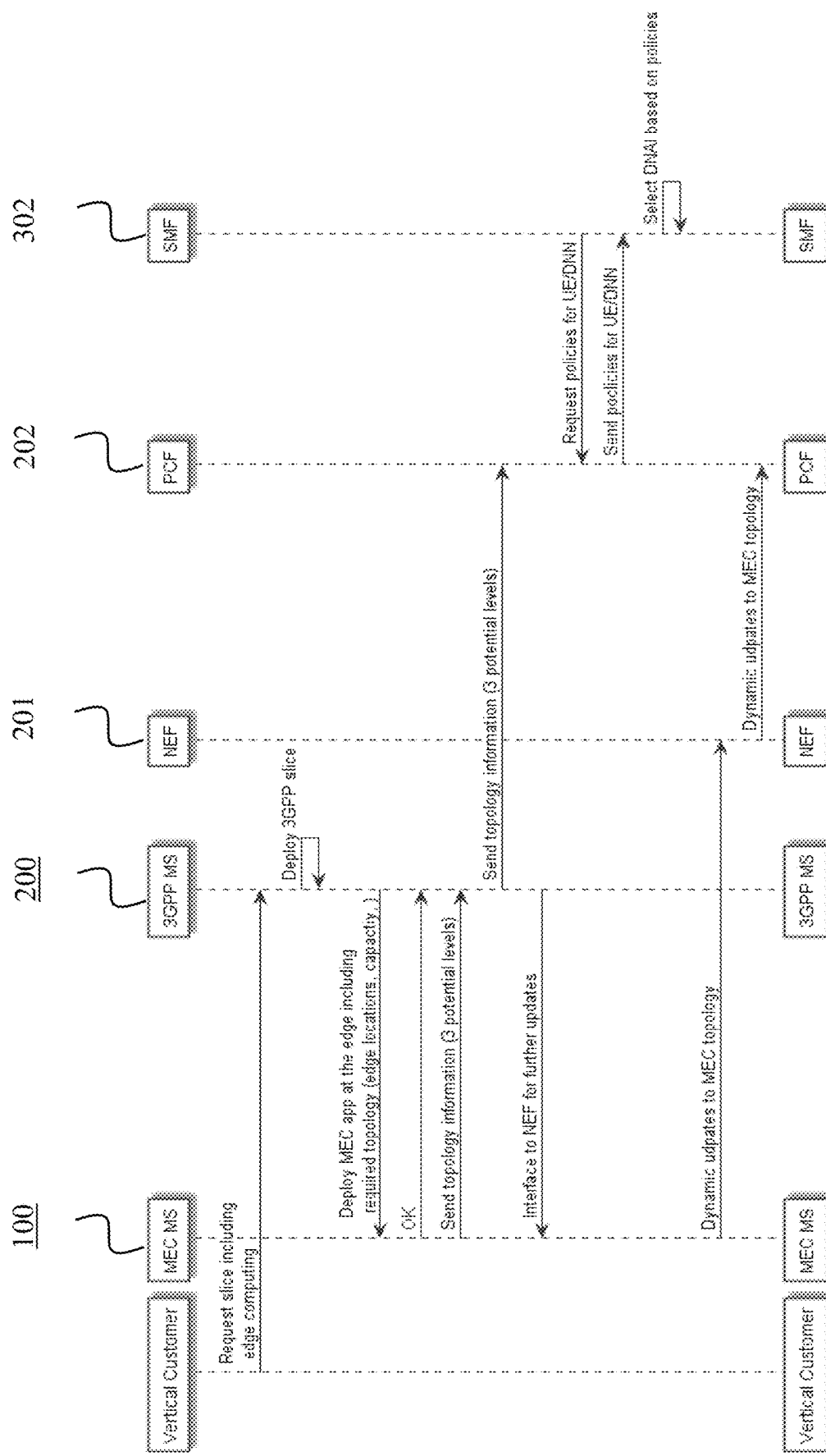
FIG. 7 shows a sequence diagram of a topology information exposure from an EC system towards a 3GPP (5G) system.

FIG. 7 shows a sequence diagram of a topology information 102 exposure from an MEC system 101 towards a 3GPP system 103. In particular, FIG. 7 relates to the first exemplary embodiment shown in FIG. 6. The following steps are performed:

1. The Vertical customer requests the slice to the 3GPP MS 200 or MEC MS 100 or BOTH (assumed for the following is 3GPP MS 200).
2. The 3GPP MS 200 requests deployment of edge hosts (EDCs 301) and applications.
3. The MEC MS 100 sends the 3GPP MS 200 the MEC topology information 102 to configure the PCF 202 accordingly.
4. To enable direct dynamic re-configuration and topology updates, the 3GPP MS 200 exposes the requested slice's NEF 201 directly to the MEC MS 100.
5. MEC MS 100 sends possible updates to NEF 201.
6. The policy for MEC topology aware DNAI selection in this embodiment is then based on the PCF configuration.

Figure 8:
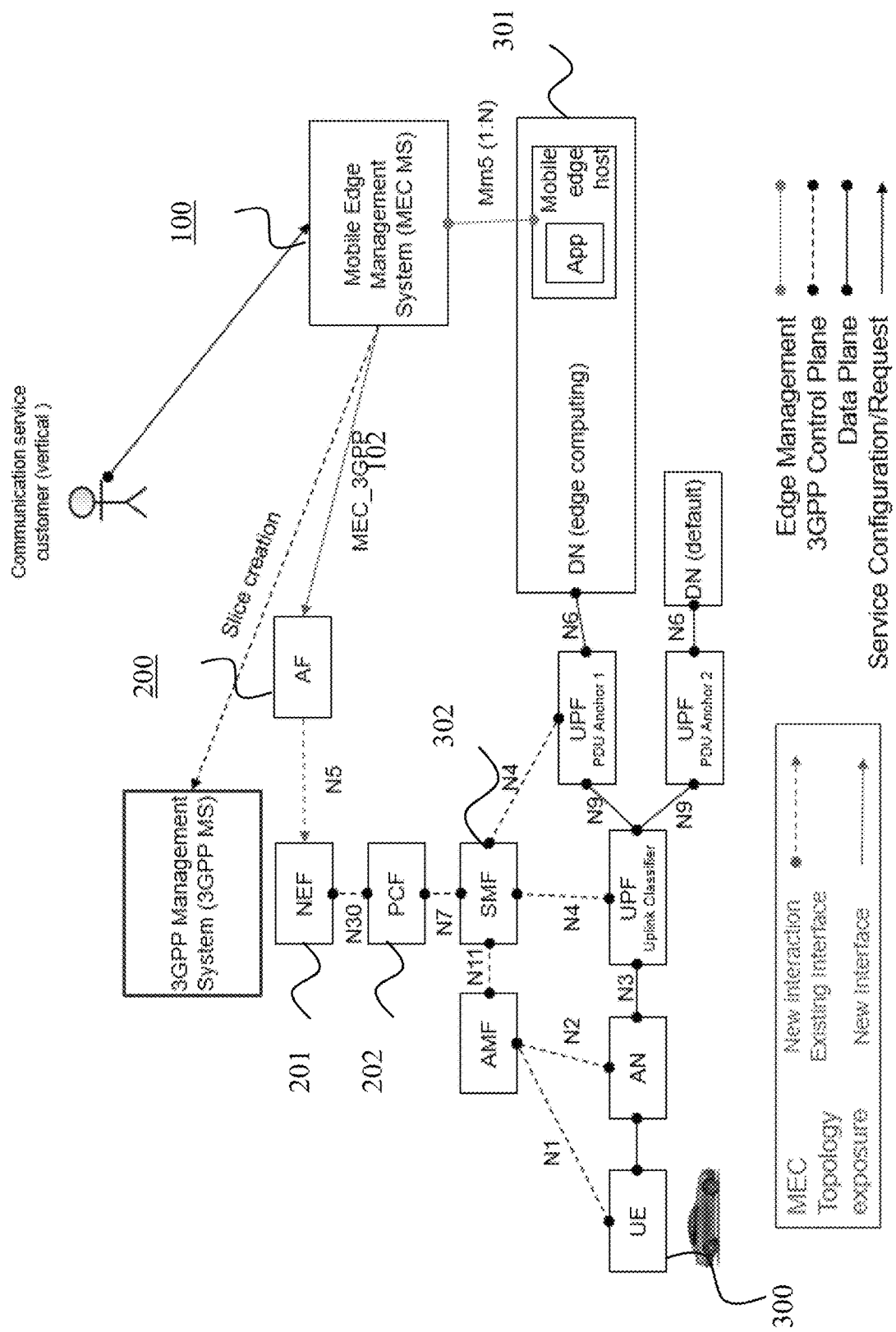
FIG. 8 shows an architecture and interaction of an EC system and a 3GPP system.

FIG. 8 shows an architecture and interaction of a MEC system 101 and a 3GPP system 103. In particular, FIG. 8 shows a second exemplary embodiment. The first exemplary embodiment of FIGS. 6 and 7 may not work optimally if the vertical has a dynamic but proprietary way of choosing the best DNN. In the second exemplary embodiment, the MEC MS (which acts in FIG. 8 as the EC entity of FIG. 1 and is thus labelled 100) sends topology information 102 to the PCF 202 via the AF (which acts in FIG. 8 as the MCC entity of FIG. 2 and is thus labelled 200) deployed by the vertical running proprietary images. The MEC MS 100 uses the new interface MEC_3GPP to send the topology information 102 to the AF 200. The AF 200 uses the existing interface N5 to send the topology information 102 further to the NEF 201.

Figure 9:
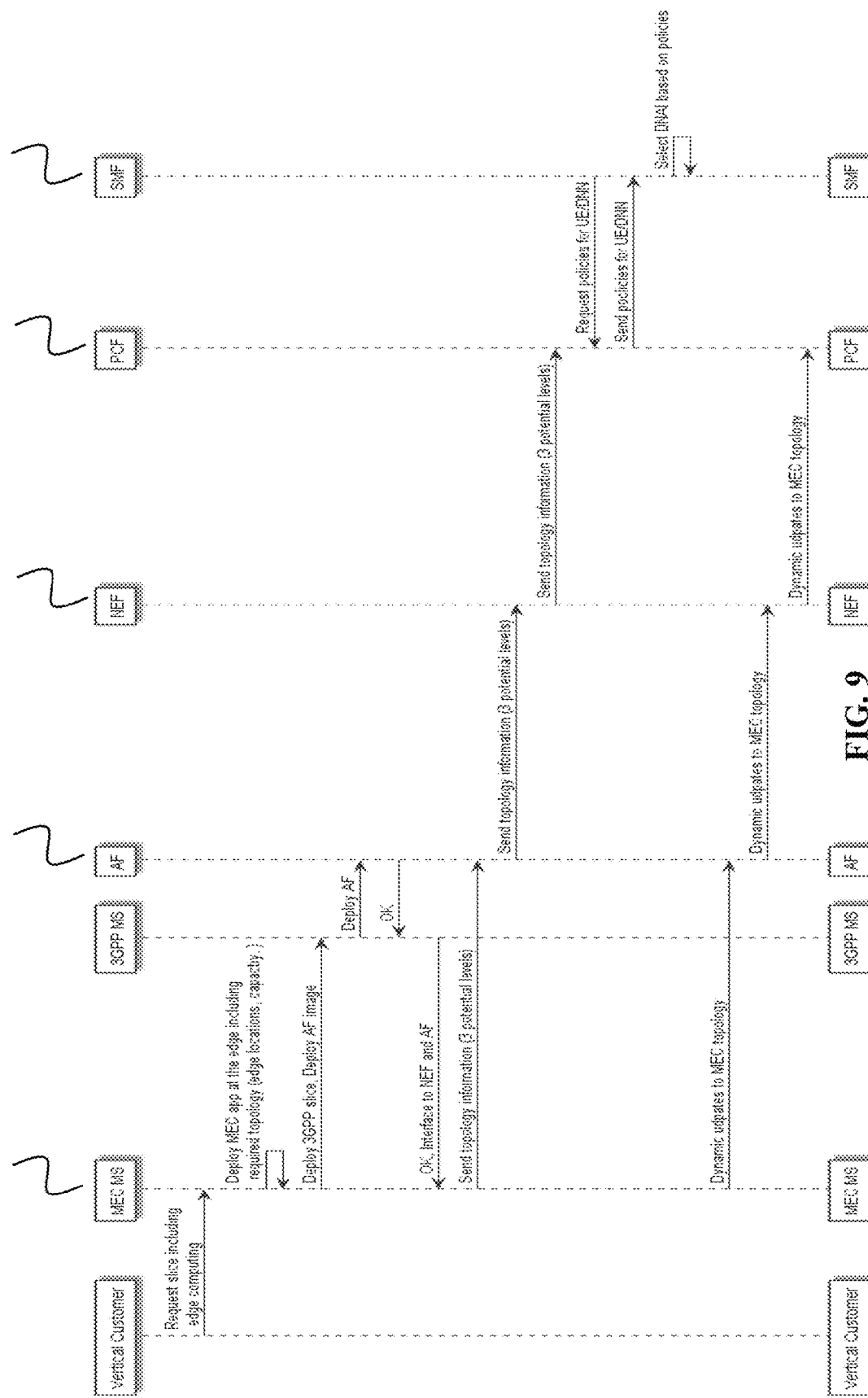
FIG. 9 shows a sequence diagram of a topology information exposure from an EC system towards a 3GPP (5G) system.

FIG. 9 shows a sequence diagram of a topology information 102 exposure from an MEC system 101 towards a 3GPP system 103. In particular, FIG. 9 relates to the second exemplary embodiment shown in FIG. 8. The following steps are performed:
1. The vertical customer requests the slice to the 3GPP MS or MEC MS 100 or BOTH (assumed for the following is MEC MS 100).
2. The MEC MS 100 deploys edge part.
3. The MEC MS 100 requests deployment of 3GPP slice and also AF 200 specific image with proprietary algorithms.
4. The MEC MS 100 sends the AF 200 the MEC topology information 102 (three possible levels).
5. Topology information 102 traverses the path AF 200, NEF 201, PCF 202.
6. Possible topology updates may be sent to the AF 200, which may be sent further following the path described in the previous step.
7. The policy for MEC topology aware DNAI selection in this embodiment is then based on the AF configuration sent to PCF 202.
8. The AF 200 might also impact the MEC topology based on load and UE information (send request to MEC MS 100 to increase/decrease/update topology)

The first and second exemplary embodiments of FIG. 6-9 may not be dynamic enough (for certain applications) as the PCF 202 is only normally accessed during new PDU setup. Thus, in a third exemplary embodiment, the MEC MS 100 may sends dynamic/urgent topology information 102 updates to the SMF 302 with or without an AF.

Figure 10:
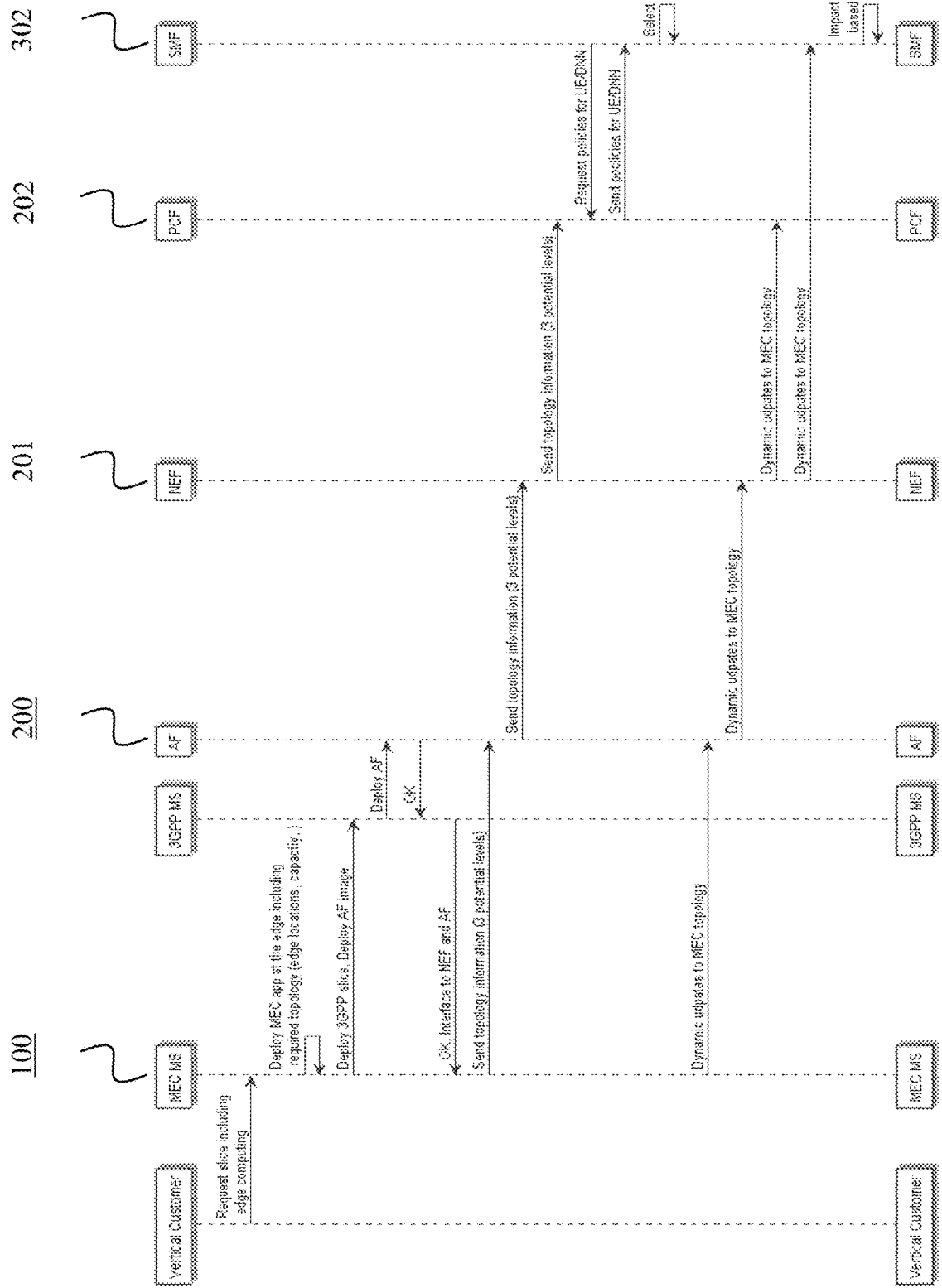
FIG. 10 shows a sequence diagram of a topology information exposure from an EC system towards a 3GPP (5G) system.

FIG. 10 shows a sequence diagram of a topology information 102 exposure from an MEC system 101 towards a 3GPP system 103. In particular, FIG. 10 relates to the third exemplary embodiment with an AF. The following steps are performed:
1. The vertical customer requests the slice to the 3GPP MS or MEC MS 100 or BOTH (assumed for the following is MEC MS 100).
2. The MEC MS 100 deploys edge part.
3. The MEC MS 100 requests deployment of 3GPP slice and also AF specific image with proprietary algorithms.
4. The MEC MS sends the AF 200 the MEC topology information 102 (three possible levels).
5. Topology information 102 traverses the path AF 200, NEF 201, PCF 202.
6. The PCF 202 is used only for the initial setup.
7. Possible dynamic updates are sent to the AF 202 and then directly to SMF 302.
8. The update for MEC topology aware DNAI selection in this embodiment is then based on the AF configuration sent to SMF 302.
9. The SMF 302 may, accordingly, ensure immediate actions on the slice performance reconfiguring existing connections to new DNAIs.
10. The AF 200 might also impact the MEC topology based on load and UE information (send request to MEC MS 100 to increase/decrease/update topology).

Figure 11:
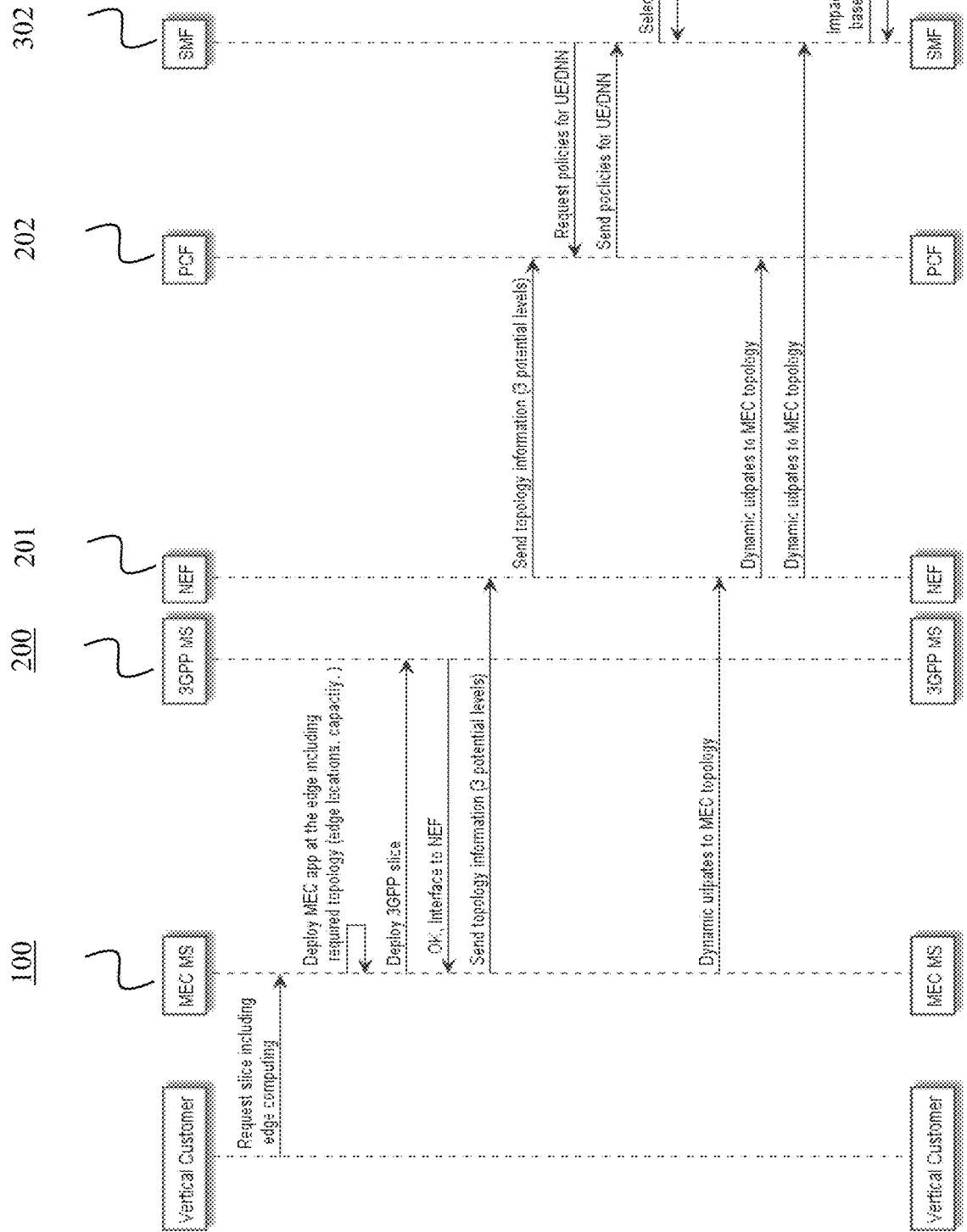
FIG. 11 shows a sequence diagram of a topology information exposure from an EC system towards a 3GPP (5G) system.

FIG. 11 shows a sequence diagram of a topology information 102 exposure from an MEC system 101 towards a 5G system 103. In particular, FIG. 11 relates to the third exemplary embodiment without AF. The following steps are performed:
1. The vertical customer requests the slice to the 3GPP MS (which in FIG. 11 acts as the MCC entity of FIG. 2 and is thus labelled 200) or MEC MS 100 or BOTH (assumed for the following is MEC MS 100).
2. The MEC MS 100 deploys edge part.
3. The MEC MS 100 requests deployment of 3GPP.
4. The MEC MS 100 sends the NEF 201 the MEC topology information 102 (three possible levels)
5. Topology information 102 traverses the path NEF 201, PCF 202, SMF 302.
6. The PCF 202 is used only for the initial setup.
7. Possible dynamic updates are sent via NEF 201 directly to SMF 302.
8. The update for MEC topology aware DNAI selection in this embodiment is then based on the MEC MS configuration sent to SMF 302.
9. The SMF 302 may, accordingly, ensure immediate actions on the slice performance reconfiguring existing connections to new DNAIs.

Figure 12:
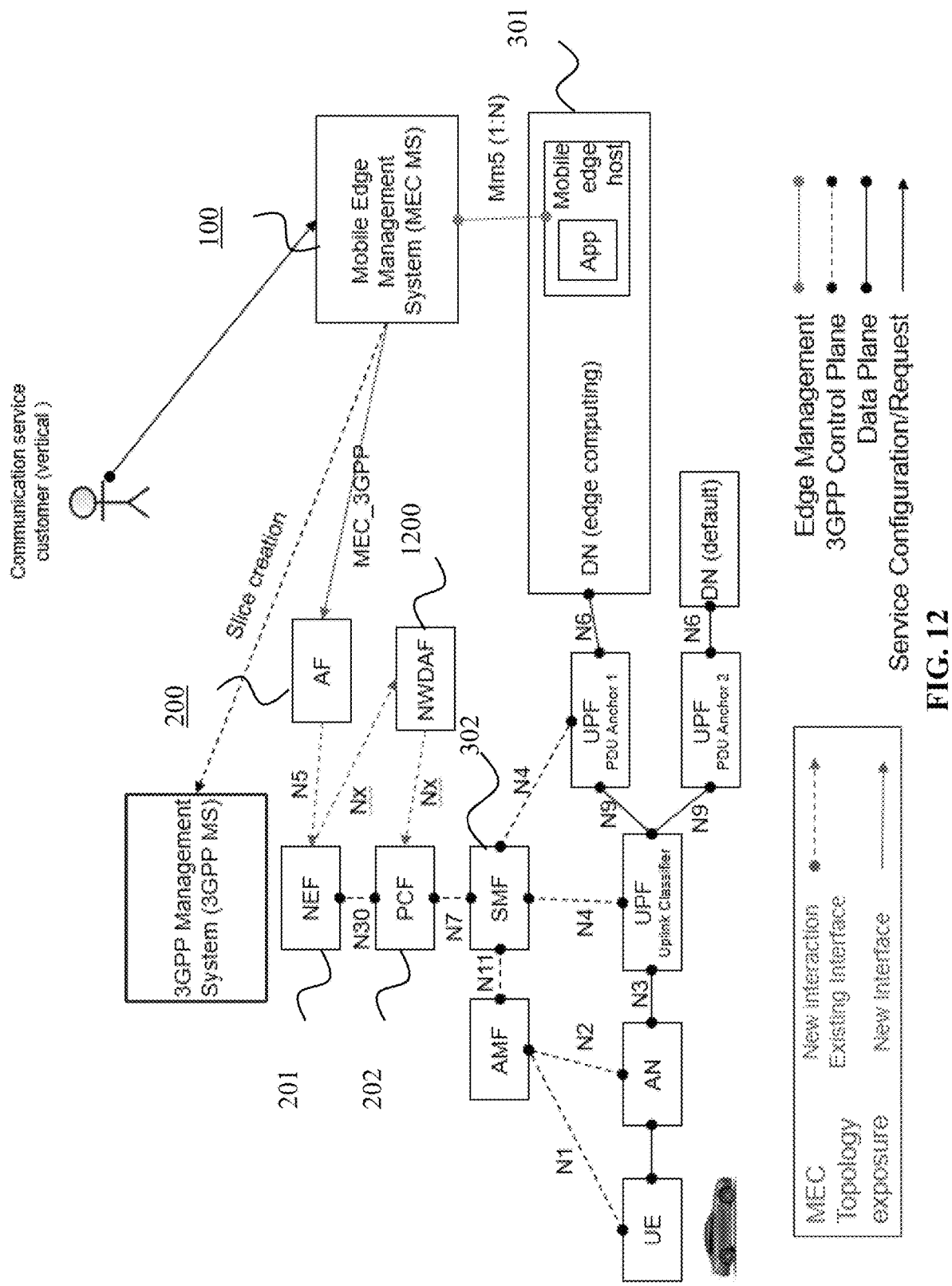
FIG. 12 shows an architecture and interaction of an EC system and a 3GPP system.

FIG. 12 shows an architecture and interaction of a MEC system 101 and a 3GPP system 103. In particular, FIG. 12 shows a fourth exemplary embodiment. In this exemplary embodiment, the MEC MS (which acts in FIG. 12 as the EC entity of FIG. 1 and is thus labelled 100) sends historical and/or dynamic topology information 102 to the PCF/SMF 202/302 via a NWDAF 1200 with an AF (which acts in FIG. 12 as the MCC entity of FIG. 2 and is thus labelled 200). However, it is also possible without AF. The MEC MS 100 sends the topology information 102 over a new interface MEC_3GPP to the AF 200. The AF 200 sends the topology information 102 over existing interface N5 to the NEF 201. The NEF 201 forwards the topology information 102 over existing interface Nx to the NWDAF 1200, which again forwards it over existing interface Nx to the PCF 202.

As mentioned, in the fourth embodiment, the MEC MS 100 may particularly send historical and/or dynamic topology information 102 to the NWDAF 1200 for analytics. The historical topology information 102 can be used by a NF following the request/response methods.

Figure 13:
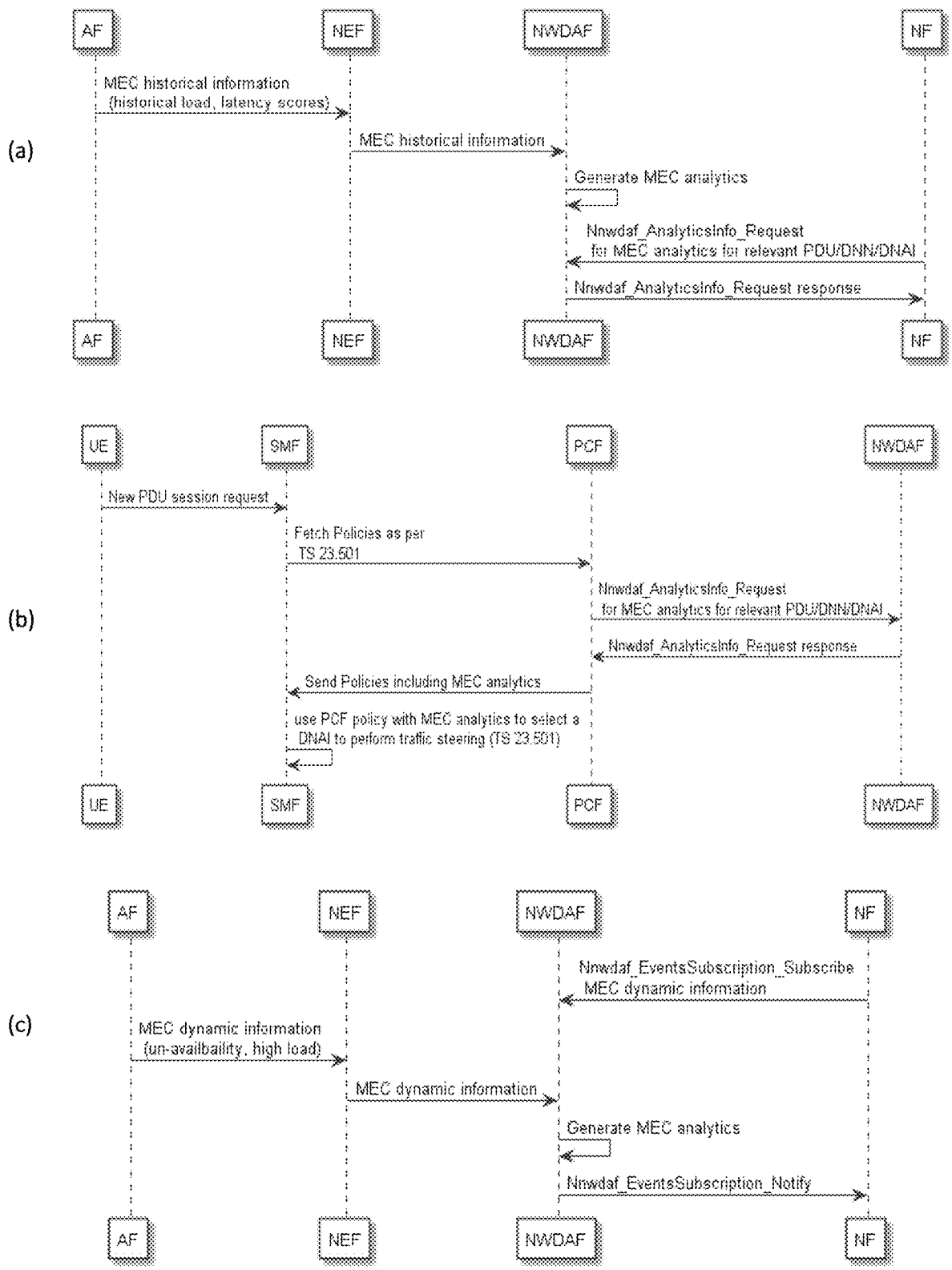
FIG. 13 shows in (a) historical topology information sent to a NWDAF; in (b) an influencing of the DNAI selection done by the SMF using analytics information; and in (c) dynamic topology information sent to the NWDAF.

FIG. 13 shows in (a)-(c) sequence diagrams that relate to the fourth exemplary embodiment shown in FIG. 12. FIG. 13(*a*) shows historical topology information 102 sent from the AF 200 to the NWDAF 1200. FIG. 13(*b*) shows an example, in which the SMF 302 is using the historical topology information 102 about load and latency to select the DNAI. Another example is shown in FIG. 13(*c*), in which dynamic topology information 102 about high load and unavailability are sent to the NWDAF 1200 to be conveyed to any NF using the subscribe/notify methods. The following steps are performed:
1. The vertical customer requests the slice to the 3GPP MS or MEC MS 100 or BOTH (assumed for the following is MEC MS 100).
2. The MEC MS 100 deploys edge part.
3. The MEC MS 100 requests deployment of 3GPP slice and also AF specific image with proprietary algorithms.
4. The MEC MS 100 sends the AF 200 the historical and/or dynamic MEC topology information 102, historical load, historical latency scores, dynamic load, dynamic latency).
5. Historical/dynamic topology information 102 traverses the path AF 200, NEF 201, NWDAF 1200.
6. The NWDAF 1200 generates the MEC analytics.
7. Any network function requiring the MEC analytics can ask for it.
8. Two types of communication between NWDAF 1200 and other NF possible: request/response or event subscribe/notify.

In all of the above embodiments, also a multi-MEC operator scenario is possible. In case there are multiple MEC providers, there is a need for the AF 200 to receive MEC topology information 102 from multiple MEC MS 100. In this case the AF 200 has the additional tasks of aggregating the topology information 102 from the different operators. The topology information 102 aggregation in the AF 200 has the tasks of combining the list (DNAI, topology information 102) from the different sources, and use the collective information for further processing as described above.

Figure 14:
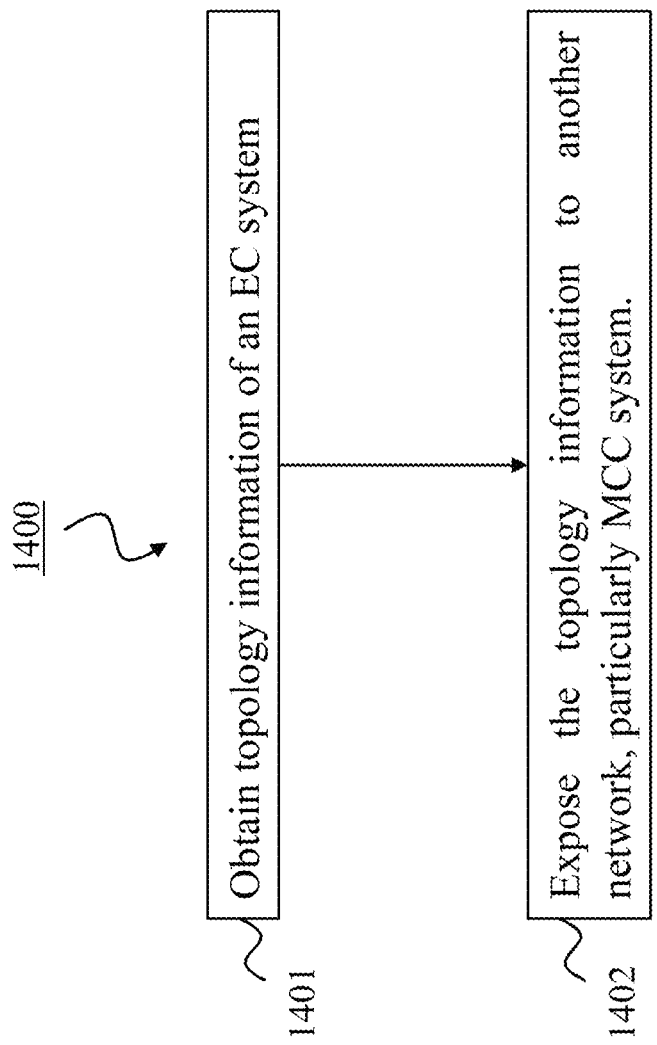
FIG. 14 shows a method according to an embodiment of the disclosure to be performed by an EC system.

FIG. 14 shows a method 1400 according to an embodiment of the disclosure, particularly a method for an EC system 101. The method 1400 may, for instance, be carried out by the EC entity 100 shown in FIG. 1. The method 1400 comprises a step 1401 of obtaining topology information 102 of the EC system 101. Further, the method 1400 comprises a step 1402 of exposing the topology information 102 to another network 103, particularly to a MCC system like a 3GPP system.

FIG. 15 shows a method 1500 according to an embodiment of the disclosure, particularly a method for a MCC system 103. The method 1500 may, for instance, be carried out by the MCC entity 200 shown in FIG. 2. The method 1500 comprises a step 1501 of receiving topology information 102 of an EC system 101. Further, the method 1500 comprises a step 1502 of providing the topology information 102 to a NEF 201 or PCF 202 of the MCC system 103.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An edge computing (EC) entity for managing an EC system, the EC entity comprising one or more processors coupled to a memory, which, alone or in combination, are configured to execute a method comprising:
   obtaining topology information of the EC system;
   exposing the topology information to a network exposure function (NEF) or a policy control function (PCF) of a third generation partnership project (3GPP) system by using an interface between the EC system and the 3GPP system; and
   exposing, as the topology information, a weight or a priority of each of a plurality of edge data centers (EDCs) in the EC system to the NEF or the PCF of the 3GPP system by using the interface between the EC system and the 3GPP system,
   wherein the EC system belongs to a non-3GPP system.

2. The EC entity according to claim 1, wherein the method further comprises exposing, as the topology information, a topology of all EDCs in the EC system to the 3GPP system.

3. The EC entity according to claim 1, wherein the topology information comprises at least one of:
   a load of at least one EDC in the EC system,
   a load on at least one link to the at least one EDC in the EC system,
   an availability of the at least one EDC in the EC system,
   a location of the at least one EDC in the EC system,
   an address or identification of the at least one EDC in the EC system, or
   multiple access information of the EC system.

4. The EC entity according to claim 1, wherein the method further comprises determining the weight or the priority of an EDC of the plurality of EDCs based on a capacity or a load of the EDC in the EC system compared to other EDCs in the EC system.

5. The EC entity according to claim 1, wherein the method further comprises determining the weight of an EDC of the plurality of EDCs dynamically or with a determined spatial or temporal validity.

6. The EC entity according to claim 1, wherein the method further comprises exposing, as the topology information, a determined selection algorithm for selecting a plurality of EDCs to the 3GPP system.

7. The EC entity according to claim 6, wherein the determined selection algorithm includes a round robin algorithm, user equipment proximity based algorithm, or an algorithm based on service differentiation.

8. The EC entity according to claim 1, wherein the method further comprises exposing the topology information via an interface to:
   a management entity of the 3GPP system, or
   an application function (AF) of the 3GPP system.

9. The EC entity according to claim 1, wherein the method further comprises providing topology information updates to the 3GPP system to:
   an application function (AF) of the 3GPP system, or
   the NEF of the 3GPP system.

10. A mobile communication core (MCC) entity for a MCC system, the MCC entity comprising one or more processors coupled to a memory, which, alone or in combination, are configured to execute a method comprising:
    receiving topology information of an edge computing (EC) system from an EC entity of the EC system;
    providing the topology information to a network exposure function (NEF) or a policy control function (PCF) of the MCC system by using an interface between the EC system and the MCC system; and
    providing, as the topology information, a weight or a priority of each of a plurality of edge data centers (EDCs) in the EC system to the NEF or the PCF of the MCC system by using the interface between the EC system and the MCC system, and
    wherein the MCC system is different from the EC system,
    wherein the MCC system belongs to a third generation partnership project (3GPP) system and the EC system belongs to a non-3GPP system.

11. The MCC entity according to claim 10, wherein the MCC entity is a MCC system management entity or is an application function (AF) of the MCC system.

12. The MCC entity according to claim 10,
    wherein the method further comprises providing the topology information together with one or more data network access identifiers (DNAIs) to the NEF or the PCF, and
    wherein each of the DNAIs is related to an EDC in the EC system.

13. The MCC entity according to claim 10, wherein the method further comprising providing the topology information together with one or more data network access identifiers (DNAIs) to the PCF via a network data analytics function (NWDAF).

14. A method for an edge computing (EC) system, the method comprising:
    obtaining topology information of the EC system; and
    exposing the topology information to a network exposure function (NEF) or a policy control function (PCF) of a third generation partnership project (3GPP) system by using an interface between the EC system and the 3GPP system, and exposing, as the topology information, a weight or a priority of each of a plurality of edge data centers (EDCs) in the EC system to the NEF or the PCF of the 3GPP system by using the interface between the EC system and the 3GPP system, wherein the 3GPP system is a mobile communication core (MCC) system that is different from the EC system, wherein the EC system belongs to a non-3GPP system.

15. A method for a mobile communication core (MCC) system, the method comprising:
 receiving topology information of an edge computing (EC) system;
 providing the topology information to a network exposure function (NEF) or a policy control function (PCF) of the MCC system by using an interface between the EC system and the MCC system; and
 providing, as the topology information, a weight or a priority of each of a plurality of edge data centers (EDCs) in the EC system to the NEF or the PCF of the MCC system by using the interface between the EC system and the MCC system,
 wherein the MCC system is different from the EC system, and
 wherein the MCC system belongs to a third generation partnership project (3GPP) system and the EC system belongs to a non-3GPP system.

16. The MCC entity according to claim 10, wherein the topology information comprises:
 a load of at least one EDC in the EC system,
 a load on at least one link to the at least one EDC in the EC system,
 an availability of the at least one EDC in the EC system,
 a location of the at least one EDC in the EC system,
 an address or identification of the at least one EDC in the EC system, and
 multiple access information of the EC system.

* * * * *